Sept. 3, 1957          J. BRILLIÉ          2,805,317

METHOD FOR ARC-WELDING IN A PROTECTIVE ATMOSPHERE

Filed Nov. 23, 1954

INVENTOR
Jean BRILLIE
BY
ATTORNEY

United States Patent Office 2,805,317
Patented Sept. 3, 1957

2,805,317

METHOD FOR ARC-WELDING IN A PROTECTIVE ATMOSPHERE

Jean Brillié, Paris, France, assignor to L'Air Liquide, Societe Anonyme pour l'Etude et l'Exploitation des Procedes Georges Claude, Paris, France Application November 23, 1954, Serial No. 470,759

7 Claims. (Cl. 219—74)

My invention relates to a method for electric arc welding steel parts in an atmosphere of inert monatomic gas such as argon or the like through the operation of a consumable electrode and to electrodes for executing said method and the manner of producing such electrodes.

Hitherto, the welding method of the type disclosed showed the drawback consisting in that it could not be used with alternating current with conventional welding power sources since it requires no-load voltages which are equal to at least 300 volts or very high frequencies which are not in current use for industrial purposes. The application of voltages of such a considerable value means resorting to special machines which are very expensive and operate with a poor power factor.

Now, according to my invention, it has been possible to obtain excellent welds with the conventional welding machines which are generally used in plants, in association with the conventional welding apparatus operating with a consumable electrode inside a protective atmosphere.

The main object of my invention consists in using a steel electrode containing in its body aluminium in an amount equal to from 0.03% to 0.30% by weight of the total electrode, which aluminum is not alloyed with the metal, said aluminium appearing for instance in the form of one or more filaments distributed throughout the cross-section of the wire forming the electrode. It is found under said conditions that the melting rate under straight polarity conditions i. e. with the negative pole connected with the electrode is lower than the melting rate under reversed polarity conditions i. e. with the positive pole connected with the electrode, these two melting rates being very near each other in contradistinction with all the wire electrodes used hitherto and this furthers considerably, as well known in the art, the welding operation with A. C. current. The presence of aluminium on the other hand improves surprisingly the mechanical grade of the welds and particularly their resiliency, in addition to its well-known stilling effect on the molten bath, which effect prevents the formation of flaws.

In contradistinction also with the results of experimentation on any known wire electrode, the presence of oxygen either in the argon atmosphere or as an oxide in the metal to be welded is generally objectionable with wire electrodes of my improved type.

I will now describe various embodiments of my invention, reference being made to accompanying drawing, wherein.

Figures 1, 2, 3, 4:
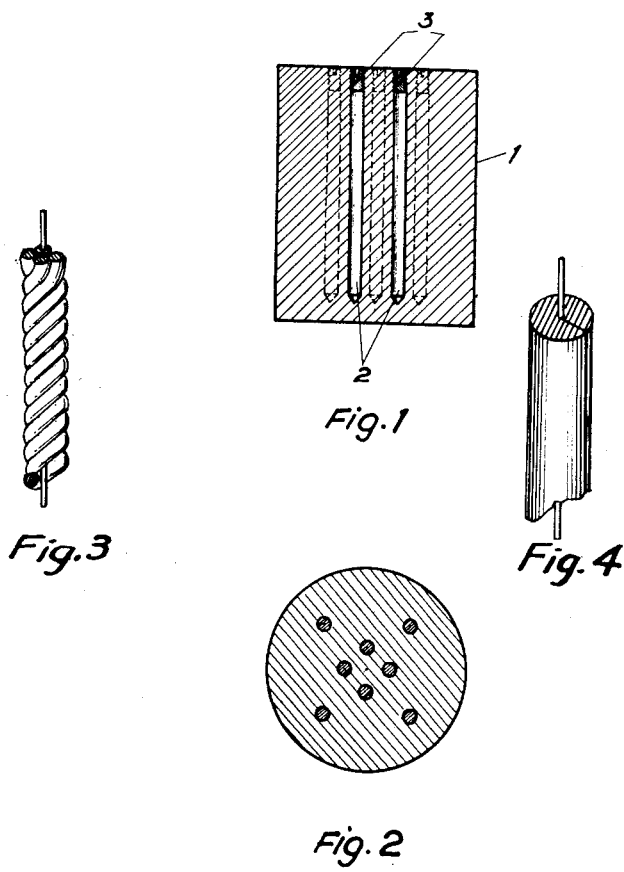
Fig. 1 is an axial cross-section of a billet prepared for the execution of a wire according to my invention.
Fig. 2 is a cross-section, drawn to an enlarged scale of a wire electrode according to my invention.
Fig. 3 illustrates a section of weld rod having an aluminum core wire surrounded by several twisted steel wires.

Fig. 4 of the drawings represents a section of weld rod having a core wire of aluminum and a sheath of steel.

The composite electrode executed in accordance with my invention is prepared for instance starting from an ordinary steel billet 1, as shown in Figs 1 and 2 of the drawings, through which a number of bores parallel with the axis of the billet are formed and in these bores I insert, with the minimum possible play, aluminium wires 2, after which the openings of the bores are closed by welded or screwed plugs 3 and the billet is drawn out according to the method disclosed in the French Patent 966,773, and in the application for a French Patent filed on October 10, 1952, by Comptoir Industriel d'Etirage et de Profilage des Métaux, entitled: "Composite Bars"; the method disclosed in said patent and patent application for the hot drawing of compound members consists, starting from a billet including transversely at least two metals, in submitting said billet to a hot drawing operation with the interposition between the said billet and the cooperating parts of the drawing press of a vitreous incombustible material adapted to melt at least partly at the temperature of operation, while remaining viscous. It is possible to obtain thus a wire the diameter of which is larger than that which is desired and the wire obtained is then drawn in the usual manner down to the final diameter required for use.

The outer diameter of the wire is equal to 1.6 mm. The wire contains 0.12% of its weight of aluminium in the form of 8 filaments of aluminium distributed in the vicinity of the axis, as illustrated in Fig. 1. The steel forming the wire is an ordinary steel containing 0.3 to 0.5% of manganese. Said wire services for operation with A. C. current under an arc voltage ranging between 27 and 30 v. When operating with D. C., the voltage across the terminals of the arc is by 5 to 10 volts lower than that which would be obtained under the same conditions of adjustment with the wires used at the present day on an industrial scale.

Under straight polarity conditions i. e. with the electrode connected with the negative pole of the source of welding current, the melting rate, i. e. the weight in grammes molten per ampere and per minute, is substantially lower than with the wires presently in use for industrial purposes. Said rate is only 0.17 to 0.18 in my case as against 0.38 in prior cases. Under reversed polarity conditions, this melting rate is equal to 0.24 as against 0.21 with conventional wires. It is thus found that the melting rates under reversed polarity and straight polarity conditions are near each other, which explains partly the stability of the arc when fed with A. C.

It has also been found by taking kinematographic views at a high speed that the transfer of the metal in alternating current welding is performed in a similar manner during the two successive half cycles for which the wire is alternatingly positive and negative.

It is also possible to use a twisted wire constituted by two or more strands of steel wire enclosing a central aluminium wire. Such a wire is illustrated in Fig. 3. It is also possible, as illustrated in Fig. 4, to form the wire by means of a steel ribbon bent into a tubular shape over an inner aluminium wire which is thus compressed inside the tubular compound wire.

What I claim is:

1. A consumable wire electrode for use in the arc welding of steel in a protective atmosphere of monatomic inert gas, consisting of a body of steel and at least one filament of aluminium extending longitudinally through the wire, the weight of the aluminium filament ranging between 0.03 and 0.3% of the weight of the wire.

2. A consumable wire electrode for use in the arc welding of steel in a protective atmosphere of monatomic inert gas, consisting of a body of steel containing about 0.3 to 0.5% of manganese and at least one filament of aluminium extending longitudinally through the wire, the weight of the aluminium filament ranging between 0.03 and 0.3% of the weight of the wire.

3. A wire electrode for use in the arc welding of steel in a protective atmosphere of monatomic inert gas, comprising a plurality of strands of steel wire twisted about a core strand of aluminium wire, and the weight of said core strand of aluminium wire comprising from 0.03 to 0.3% of the total weight of the electrode.

4. A wire electrode for use in the arc welding of steel in a protective atmosphere comprising an aluminium wire and a steel ribbon bent transversely into a substantially tubular shape and closed and clamped over the aluminium wire extending inside the tubular ribbon and the weight of which ranges between about 0.03 and 0.3% of the weight of the ribbon.

5. In an arc welding method which comprises establishing a welding arc from an electrode to a ferrous workpiece, feeding said electrode toward said workpiece at a rate to maintain said arc as weld metal is transferred across said arc from said electrode to said workpiece, and shielding the arc end of said electrode, said arc, and the molten weld metal produced thereby with a flowing stream of shielding gas comprising essentially monatomic inert gas, the improvement which comprises employing an electrode comprising essentially iron and containing as an essential ingredient within said electrode a strand of unalloyed aluminum having a weight equal to from 0.03% to 0.30% of the total weight of electrode.

6. A welding method according to claim 5 in which the welding arc is a direct current arc having the electrode as the cathode and the workpiece as the anode.

7. A welding method according to claim 5, in which the welding arc is an alternating current arc.

References Cited in the file of this patent

UNITED STATES PATENTS

| | | |
|---|---|---|
| 1,144,390 | Strohmenger | June 29, 1915 |
| 1,323,768 | Hyde | Dec. 2, 1919 |
| 1,361,269 | Mattice | Dec. 7, 1920 |
| 1,640,859 | Stoody | Aug. 30, 1927 |
| 2,319,977 | Cape et al. | May 25, 1943 |
| 2,504,868 | Muller et al. | Apr. 18, 1950 |
| 2,683,207 | Lewis et al. | July 6, 1954 |
| 2,694,763 | Muller | Nov. 16, 1954 |
| 2,694,764 | Muller | Nov. 16, 1954 |